(12) United States Patent
Kandlbinder et al.

(10) Patent No.: US 10,207,629 B2
(45) Date of Patent: Feb. 19, 2019

(54) METHOD FOR MOUNTING A FRONT-END MODULE AND A FRONT HEADLAMP ON A BODY OF A PASSENGER CAR AND HOLDING ARRANGEMENT FOR HOLDING A FRONT HEADLAMP ON A FRONT-END MODULE

(71) Applicant: Bayerische Motoren Werke Aktiengesellschaft, Munich (DE)

(72) Inventors: Josef Kandlbinder, Mauth (DE); Manfred Leidenberger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 310 days.

(21) Appl. No.: 15/095,659

(22) Filed: Apr. 11, 2016

(65) Prior Publication Data
US 2016/0221490 A1 Aug. 4, 2016

Related U.S. Application Data

(63) Continuation of application No. PCT/EP2014/071884, filed on Oct. 13, 2014.

(30) Foreign Application Priority Data

Oct. 11, 2013 (DE) .......................... 10 2013 220 574

(51) Int. Cl.
*B60Q 1/04* (2006.01)
*B60Q 1/068* (2006.01)
*B62D 65/16* (2006.01)

(52) U.S. Cl.
CPC .......... *B60Q 1/0475* (2013.01); *B60Q 1/068* (2013.01); *B62D 65/16* (2013.01); *Y10T 29/49622* (2015.01)

(58) Field of Classification Search
CPC .. Y10T 29/49622; B21D 53/88; B62D 65/00; B62D 65/02; B62D 65/04; B64C 1/12
See application file for complete search history.

(56) References Cited

U.S. PATENT DOCUMENTS 7,891,850 B2 * 2/2011 Breisacher ........... B60Q 1/0416
29/453
2009/0196065 A1 8/2009 Joly-Pottuz et al.
(Continued)

FOREIGN PATENT DOCUMENTS

DE 199 46 995 A1 4/2000
DE 600 00 006 T2 3/2002
(Continued)

OTHER PUBLICATIONS

International Search Report (PCT/ISA/210) issued in PCT Application No. PCT/EP2014/071884 dated Jan. 19, 2015 with English translation (seven pages).
(Continued)

*Primary Examiner* — Jason L Vaughan
(74) *Attorney, Agent, or Firm* — Crowell & Moring LLP

(57) ABSTRACT

A method is provided for mounting a front-end module and at least one front headlamp on a body of a passenger car, including the steps of: holding the front headlamp in at least one pre-mounting position on the front-end module via a holding device, by which the front headlamp is held on the front-end module so as to be movable relative to the latter; arranging the front-end module on the body together with the front headlamp held thereon via the holding device so as to be movable relative to the front-end module, wherein the front-end module and therewith also the front headlamp are moved relative to the body; and fixing the front headlamp in a final mounted position.

6 Claims, 2 Drawing Sheets

(56) References Cited

U.S. PATENT DOCUMENTS

| | | |
|---|---|---|
| 2009/0201691 A1 | 8/2009 | Breisacher |
| 2010/0007176 A1 | 1/2010 | Becher et al. |
| 2012/0077137 A1 | 3/2012 | Schmidt et al. |
| 2014/0165364 A1 | 6/2014 | Labbe et al. |

FOREIGN PATENT DOCUMENTS

| | | |
|---|---|---|
| DE | 10 2006 026 255 A1 | 12/2007 |
| DE | 10 2006 039 627 B3 | 1/2008 |
| DE | 10 2006 054 720 A1 | 6/2008 |
| DE | 10 2008 000 238 A1 | 8/2009 |
| DE | 10 2008 051 290 A1 | 4/2010 |
| DE | 10 2009 019 730 A1 | 11/2010 |
| DE | 10 2012 023 770 A1 | 6/2014 |
| EP | 1 024 075 A1 | 8/2000 |
| EP | 1 481 878 A1 | 12/2004 |
| EP | 1 977 957 A2 | 10/2008 |
| EP | 2 221 217 A2 | 8/2010 |
| EP | 2 298 600 A1 | 3/2011 |

OTHER PUBLICATIONS

German-language Written Opinion (PCT/ISA/237) ) issued in PCT Application No. PCT/EP2014/071884 dated Jan. 19, 2015 (six pages).
German Search Report issued in counterpart German Application No. 10 2013 220 574.0 dated Aug. 21, 2014 with partial English translation (eight pages).

\* cited by examiner

METHOD FOR MOUNTING A FRONT-END MODULE AND A FRONT HEADLAMP ON A BODY OF A PASSENGER CAR AND HOLDING ARRANGEMENT FOR HOLDING A FRONT HEADLAMP ON A FRONT-END MODULE

CROSS REFERENCE TO RELATED APPLICATIONS

This application is a continuation of PCT International Application No. PCT/EP2014/071884, filed Oct. 13, 2014, which claims priority under 35 U.S.C. § 119 from German Patent Application No. 10 2013 220 574.0, filed Oct. 11, 2013, the entire disclosures of which are herein expressly incorporated by reference.

BACKGROUND AND SUMMARY OF THE INVENTION

The invention relates to a method of mounting a front-end module and a front headlamp on a body of a passenger car as well as to a holding arrangement for a front headlamp on a front-end module of a passenger car.

Front-end modules for passenger cars are known from the general state of the art, for example, from the BMW 5-series. Such a front-end module includes, for example, at least one support, which is equipped with attachment parts, such as front headlamps of the passenger car. The front-end module with the attachment parts can therefore be manufactured or preassembled as a module component at least essentially simultaneously with the remaining passenger car, for example, with its body, and can finally be mounted as a preassembled module component on the vehicle body or joined with the latter.

When arranging the module component (of the front-end module with the front headlamps) on the vehicle body, the alignment, i.e. the positioning of the front headlamps relative to the front-end module and relative to the vehicle body and, therefore, relative to covering parts possibly arranged on the vehicle body, plays an important role in order to implement an at least essentially uniform and therefore visually attractive joint image. The covering parts may, for example, be so-called side panels, particularly fenders, respective joints being bounded, on the one side, by the fenders and, on the other side, by the front headlamps. Additional joints may be provided, for example, between the front headlamps and a bumper covering of the front-end module and/or between the front headlamps and a front opening hood in its closed position. For achieving a desired and particularly at least essentially constant clearance of these joints, the front headlamps are to be correspondingly aligned relative to the above-mentioned components (fenders, bumpers, front-opening hood) and therefore relative to the vehicle body.

The alignment of the front headlamps usually takes place such that the front headlamps are positioned relative to the front-end module by use of a complex gauge and are fastened to the front-end module by way of tolerance compensation elements. Finally, the assembly consisting of the front-end module and front headlamps is joined with the vehicle body. This joining normally takes place in the longitudinal direction of the vehicle (x-direction). Offsets between the front headlamps and the vehicle body or the fenders take place particularly as a result of production-caused tolerances, so that the desired joint image will not necessarily occur during the mounting of the front-end module with the front headlamps on the vehicle body. As a result of these tolerances, force may be introduced into the front headlamps during the joining of the above-mentioned assembly with the vehicle body in the joint area, for example, between the front headlamps and the fenders already arranged at the vehicle body, so that the front headlamps are moved, for example, rotated, from their position adjusted by means of the gauge. This rotating impairs the desired clearance between the front headlamps and the fenders as well as possibly other clearances, for example, between the front headlamps in a grille, the bumper covering and/or the engine hood.

In order to now set a desired clearance or joint image in the case of the finished passenger car, time-consuming and costly adjusting work will be required after the joining of the assembly with the vehicle body.

European Patent document EP 2 298 600 A1 illustrates a method of aligning a headlamp on a vehicle, whereby the headlamp is accommodated by a holding arm, which is fastened to an assembly carrier of a front-end module. The assembly carrier is mounted on a structural component of the vehicle body. During the final assembly, an elastic element adjoining the holding arm is deformed by means of a tool-operable adjusting element such that the holding arm is moved in a predefined adjusting direction until the headlamp takes up an adjusted position with a predefined joint course with respect to an adjacent side part of the vehicle body. The holding arm subsequently is fixed in this adjusted position at least with respect to the adjusting direction. Although a defined joint image can be achieved by use of this process, a tool has to be used for operating the adjusting element. This requires a corresponding accessibility to the adjusting element when the front-end module is arranged on the vehicle body because the headlamp can otherwise not be adjusted at all.

It is therefore an object of the present invention to provide a method of mounting a front-end module and a front headlamp on a body of a passenger car as well as to provide a holding arrangement for a front headlamp on a front-end module, by which the front headlamp can be aligned or positioned in a simple time-saving and cost efficient manner relative to the front-end module and/or relative to the vehicle body.

This object is achieved by a method as well as by a holding arrangement according to embodiments of the invention.

A first aspect of the invention relates to a method of mounting a front-end module and at least one front headlamp on a body of a passenger car. The method comprises a Step a), in which the front headlamp is held in at least one pre-assembly position at the front-end module by way of a holding device. In this case, the front headlamp is held at the front-end module by the holding device, being movable relative to the latter. In other words, although the front headlamp is held on the front-end module by way of the holding device, the front headlamp can still be moved relative to the front-end module.

The method comprises a Step b), in which the front-end module, together with the front headlamp held at the front-end module by way of the holding device so as to be movable relative to the front-end module, is arranged on the vehicle body. The front-end module and, together with the latter, the front headlamp are moved relative to the vehicle body. Also in this case, the front headlamp can still be moved relative to the front-end module and relative to the vehicle body. As a result, the arrangement of the front-end module and of the front headlamp on the vehicle body can be associated with an alignment of the front headlamp relative to the front-end module and relative to the vehicle body. In this case, the front headlamp can move relative to the front-end module or the front head lamp can be moved, for example, by a person carrying out the assembly. In this case, the front headlamp may be guided by the person, so that the front headlamp can finally be moved into its final assembly position.

In a further Step c) of the method, the front headlamp held by way of the holding device on the front-end module is finally fixed in its final assembly position. The method according to the invention permits the simple time-saving and cost-effective alignment of the front headlamp relative to the front-end module and relative to the vehicle body, because at first the front headlamp can still move relative to the front-end module and to the vehicle body. As a result, during the mounting of the front-end module and of the front headlamp on the vehicle body, an adjusting or centering of the front headlamp can take place. In this case, the front headlamp is moved or can be moved, for example, by at least one component which is held on the vehicle body and comes in contact with the front headlamp, from its pre-assembly position into a position that differs therefrom, particularly into the final assembly position. Since this desired alignment of the front headlamp already takes place during the mounting of the front-end module and of the front headlamp on the vehicle body, time-consuming and costly adjusting work for aligning the front headlamp can be avoided. With respect to time, Step c) preferably takes place after Step b), so that the fixing of the front headlamp no longer has to be released in order to be able to align the latter.

Within the scope of the method, for example, in the course of the pre-assembly, the front headlamp is hung accurately to size by way of the holding device into the front-end module in the vertical direction (z-direction) of the vehicle and in the longitudinal (x-direction) of the vehicle. Here, the front headlamp is fixed, for example, at two points in the x-direction and at one point in the z-direction, so that at first three of a total of six degrees of freedom are restricted. The hanging-in takes place, for example, by way of oblong holes of the holding device extending in the transverse direction of the vehicle, so that, in this condition, the front headlamp can still be moved in the transverse direction (y-direction) of the vehicle, be tilted or swiveled about the x-direction and be swiveled about the z-direction.

In order to transport the front headlamp in this condition, for example, from the pre-assembly into the final assembly, at least one transport securing arrangement can be used, by which the movement of the front headlamp relative to the front-end module is restricted. The front headlamp can still move slightly relative to the front-end module, but a complete detachment from the front-end module is prevented, so that the front-end module can be securely transported together with the front headlamp. The transport securing arrangement therefore operates as a loss prevention arrangement.

The transport securing arrangement may be that a first wall of the front-end module is partially accommodated in a recess of a second wall of the front headlamp. As an alternative or in addition, it may be provided that the walls each have a receiving opening, particularly a through-opening, a form-fitting element, such as a pin engaging in the receiving opening. As a result, the movement of the front headlamp will be limited in a form-fitting manner.

After the transport, the pin can be removed or the transport securing arrangement can be neutralized, so that the front headlamp can again be moved over a large area relative to the front-end module and can be aligned within the scope of the assembly.

Since—as described above—so far, only three of six degrees of freedom have been restricted, the front headlamp could still be moved upward in the z-direction. Within the scope of the assembly, this degree of freedom is also restricted, for example, by way of at least two interacting aligning elements, so that four of six degrees of freedom are restricted.

In order to restrict the swivelability of the front headlamp about the z-direction, the front headlamp is fixed in a third point in the x-direction. This takes place, for example, by use of a sealing and/or an aligning element provided at the front headlamp, which sealing or aligning element can interact with the vehicle body or with a component fixed to the vehicle body. As an alternative, this restriction or fixing takes place by way of at least one auxiliary device or auxiliary element, which may be fixed to the vehicle body and/or to the front-end module.

In this condition, five of six degrees of freedom are restricted. The front headlamp could only still be moved in the y-direction in this condition. In order to avoid this movement, a restriction of the sixth and therefore last degree of freedom takes place. This—as also the other fixations and restrictions of the degrees of freedom—can take place on the product side, i.e. by use of at least one element provided on the front headlamp and by use of at least one element interacting therewith, which is arranged directly on the vehicle body or on a component fixed to the vehicle body.

As an alternative or in addition, the respective restriction can take place by means of at least one auxiliary device or auxiliary element, which is fixed at least indirectly to the vehicle body. The auxiliary element can be fixed directly to the vehicle body or to an attachment component fixed to the vehicle body, such as a covering element or the front-end module. If the six degrees of freedom are restricted, the front headlamp will be fixed in its final assembly position at the front-end module and therefore relative to the vehicle body.

Furthermore, according to the invention, in Step b), at least a second aligning element provided at the front headlamp is caused to interact with a second aligning element assigned to the body of the passenger car. The front headlamp is moved by way of the interacting aligning elements during the movement of the front headlamp relative to the vehicle body to a position, particularly into the final assembly position, relative to the vehicle body and relative to the front-end module.

By use of the mutually interacting aligning elements, the front headlamp can be particularly precisely aligned relative to the vehicle body and relative to the front-end module, so that tolerances and tolerance-caused offsets can be compensated and joints with particularly small clearances can be implemented without high-expenditure finishing.

In contrast to the aligning process of a front-end module illustrated in European Patent document EP 2 298 600 A1, it is the main advantage of this invention that, as a result of the mutually interacting aligning elements, without the use of an additional tool, (thus in a tool-free manner), the front headlamp can be aligned relative to the vehicle body and to the front-end module and can be taken to its final assembly position. No tools whatsoever, such as turning tools in the form of screwdrivers or the like, have to be used for positioning the front headlamp in its final mounting position. Therefore, no accessibility to possible setting or adjusting elements by use of tools has to be provided, if the front-end module was mounted on the vehicle body. The front-end module, the headlamp and the vehicle body only have to be designed such that the aligning elements can be caused to interact, so that the front headlamp can be moved by way of the interacting aligning elements, during the movement of the front headlamp relative to the vehicle body, into a position, particularly the final assembly position, relative to the vehicle body and relative to the front-end module.

When arranging the front-end module, together with the front headlamp movably held on the latter relative to the front-end module by way of the holding device on the vehicle body, as a result of the interaction of the aligning elements, thus necessarily, an alignment of the front headlamp into its final assembly position relative to the vehicle body and relative to the front-end module will take place. For example, a worker, possibly by use of a device, still only has to position the front-end module with respect to the vehicle body. A worker will, for example, press the headlamp or the front-end module so far in the direction of the vehicle body that the respective aligning elements rest again one another, whereby the final assembly position is reached.

The mutually corresponding aligning elements are preferably designed such that all degrees of freedom of motion will be restricted that still exist at the front-end module in the preassembled condition of the front headlamp, after the arrangement of the front-end module, together with the front headlamp movably held on the latter relative to the front-end module by way of the holding device on the vehicle body. In other words, the corresponding aligning elements are designed such that, as soon as the front headlamp has been mounted in its final assembly position on the vehicle body, at least essentially no relative motion takes place any longer between the front headlamp and the front module and also no relative motion is conceivable any more between the front headlamp and the vehicle body, in which case a correspondingly defined joint image is implemented.

The holding device, by which the front headlamp is movably held relative to the latter at the front-end module, can be removed after the fixing of the front headlamp in this final assembly position, i.e. after Step c), can be removed from the front-end module. In this case, the holding device is therefore not also used for holding the front headlamp in its final mounting position. The holding of the front headlamp in its final assembly position therefore takes place by way of a fixing device that differs from the holding device.

However, in a particularly advantageous embodiment of the invention, it is provided that the holding device is also used for the holding of the front headlamp in its final assembly position. The holding device is therefore also used as a fixing device. This minimizes the complexity of the process, particularly the number of process steps.

A second aspect of the invention relates to a holding arrangement of a front headlamp on a front-end module of a passenger car. In the case of the holding arrangement, the front headlamp is held in a final assembly position of the front headlamp on the front-end module by way of a holding device.

In other words, the holding device is used for holding the front headlamp in its final assembly position at the front-end module. In at least one pre-assembly position of the front headlamp, the headlamp is to be movably held at the front-end module relative to the module. This means that, in its pre-assembly position, in which the front headlamp is held on the front-end module by way of the holding device, the front headlamp can still be moved relative to the front-end module and can therefore be aligned and can be moved, for example, into the final assembly position relative to the front-end module.

When the front headlamp is in its desired final assembly position, in which, for example, by way of an attachment component arranged at the front-end module, such as a bumper covering, and/or by means of at least one covering element, such as a side wall, particularly a fender, it bounds at least one joint with a desired clearance, it can be fixed in the final assembly position. The front headlamp will then be held in its final assembly position by way of the holding device at the front-end module and will be fixed, for example, by means of at least one fastening element, such as a screw. The holding device therefore makes it possible to pre-assemble the front headlamp at the front-end module in the pre-assembly position. In this case, the front headlamp is held at the front-end module, but can still be moved relative to the front-end module. Advantageous further developments of the first aspect of the invention are to be considered to be advantageous developments of the second aspect of the invention and vice-versa.

When, for example, the front-end module together with the front headlamp is now joined with the vehicle body, i.e. is mounted on the latter, the front-end module together with the front headlamp being moved relative to the vehicle body, during the movement relative to the vehicle body, the front headlamp can be moved out of its pre-assembly position into its final assembly position. If the front headlamp is arranged, for example, in a receiving area provided on the vehicle body, the front headlamp—because it can be moved in its preassembly position also relative to the front-end module—can be moved into its final assembly position, when the front headlamp comes in contact with a component bounding the receiving area and provided on the vehicle body. The mobility of the front headlamp, which is provided or made possible by the holding device during its mounting, will then exist and will only exist when the above-mentioned transport securing arrangement is removed. By means of the holding arrangement according to the invention, a centering or an adjusting of the front headlamp can therefore be implemented during its mounting, so that time-consuming and costly as well as complex adjusting work for the aligning of the front headlamp can be avoided. Furthermore, excessive introductions of force into the front headlamp and resulting damage can be avoided because the front headlamp movably held at the front-end module relative to the latter does not need such introductions of force.

The above-mentioned receiving area may be bounded, at least in sections, for example, by the vehicle body itself or by an attachment component, such as a covering element, particularly a side wall and particularly a fender.

Since the front headlamp is held or is to be held at the front-end module so that it is movable relative to the latter, a contemplated and, for example, tolerance-caused offset between the front headlamp and the component at least partially bounding the receiving area can be compensated directly by the front headlamp and the component interacting with the latter, so that a joint with a desired clearance between the component and the front headlamp can be adjusted, when the front-end module together with the front headlamp is mounted on the vehicle body and, in the process the front headlamp is moved into the receiving area.

A high-expenditure prepositioning of the front headlamp on the front-end module by use of a gauge can be avoided, whereby processes for servicing the gauge and for monitoring such positioning operations can also be omitted. Furthermore, joints between the front headlamp and components of the passenger car adjoining the latter can be reduced because of lower mounting tolerances. In addition, a process-reliable mounting can be illustrated.

Furthermore, the formation of a module component comprising at least the front-end module and the front headlamp can be maintained because the front headlamp can be preassembled at the front-end module by use of the holding device and can be arranged on the vehicle body in the preassembled state. In other words, it becomes possible to equip the front-end module with the front headlamp at least essentially simultaneously with the manufacturing of the rest of the passenger car, to thereby create a preassembled module component comprising at least the front headlamp and the front-end module, and to finally join the module component in the preassembled state with the vehicle body. As a result, a time-saving and cost-effective manufacturing of the entire passenger car can be implemented.

For implementing a particularly precise and simple alignment of the front headlamp, it is provided according to the invention that at least a first aligning element is provided at the front headlamp, by which, with the interaction of the first aligning element with a second aligning element assigned to the body of the passenger car, the front headlamp is to be aligned relative to the front-end module and to the vehicle body. This means that the second aligning element is arranged directly on the vehicle body itself, on a component arranged at the vehicle body or is itself the component. The second aligning element can therefore be a component arranged on the vehicle body, such as a covering element, particularly a side wall and especially a fender. The aligning element provided at the front headlamp is, for example, a component constructed in one piece with the front headlamp or with a component of the front headlamp or a component which is constructed separately from the front headlamp and is fastened to the latter.

For mounting the front-end module together with the front headlamp on the vehicle body, these are moved relative to the vehicle body onto the vehicle body. In this process, the two aligning elements are caused to interact. When the front-end module and the front headlamp are then moved farther relative to the vehicle body, this is accompanied by a relative motion of the aligning elements with respect to one another. By means of the aligning elements, a precise motion or alignment of the front headlamp relative to the front end module and relative to the vehicle body is caused. As a result, the front headlamp is moved in a particularly simple manner from its preassembly position to its final assembly position, without requiring high-expenditure finishing.

In an advantageous further development of the invention, the holding device has at least one hinge, by which the front headlamp can be swiveled in its preassembly position relative to the front-end module. In this case, the front headlamp can be swiveled, for example, about a swivel axis which extends at least essentially in the vertical direction of the vehicle. As a result of this swivelability of the front headlamp, conceivable tolerance-caused offsets between the front headlamp and the front-end module and/or between the front headlamp and the vehicle body or components held at the vehicle body can be compensated in a particularly simple manner. By use of the hinge, the front headlamp—as described in connection with the method—can be swiveled, for example, about the y-axis.

It was found to be particularly advantageous for the holding device to include at least one holding element, by which the front headlamp is held in its preassembly position relative to the front-end module, particularly moveably in the y-direction at the front-end module. This means that, in its condition held at the front-end module or preassembled relative to the front-end module, the further headlamp can be moved in at least one direction, whereby tolerances can be particularly well compensated in a precise manner. As a result of the swivelability and/or moveability of the front headlamp, it therefore becomes possible to implement in a simple manner joints with a very small clearance between the front headlamp and at least one component of the passenger car adjoining the front headlamp.

A further embodiment is distinguished in that the holding device includes at least a first positioning element provided on the front headlamp and at least a second positioning element corresponding therewith and provided at the front-end module. By way of the positioning elements, the motion of the front headlamp relative to the front-end module can be limited. In other words, the positioning elements permit a motion of the front headlamp relative to the front-end module and thereby relative to the vehicle body, but they prevent an excessive motion. The front headlamp can thereby be held and prepositioned particularly securely at the front-end module, so that the front headlamp can, for example, be moved and particularly be transported by way of the front-end module without any undesirable detachment of the front headlamp from the front-end module. Furthermore, the positioning elements permit the motion of the front headlamp relative to the vehicle body and relative to the front-end module during the mounting of the front-end module, so that the tolerances and offsets can be compensated in a simple fashion.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures identical elements or elements having the same function are provided with the same reference numbers.

Figure 1:
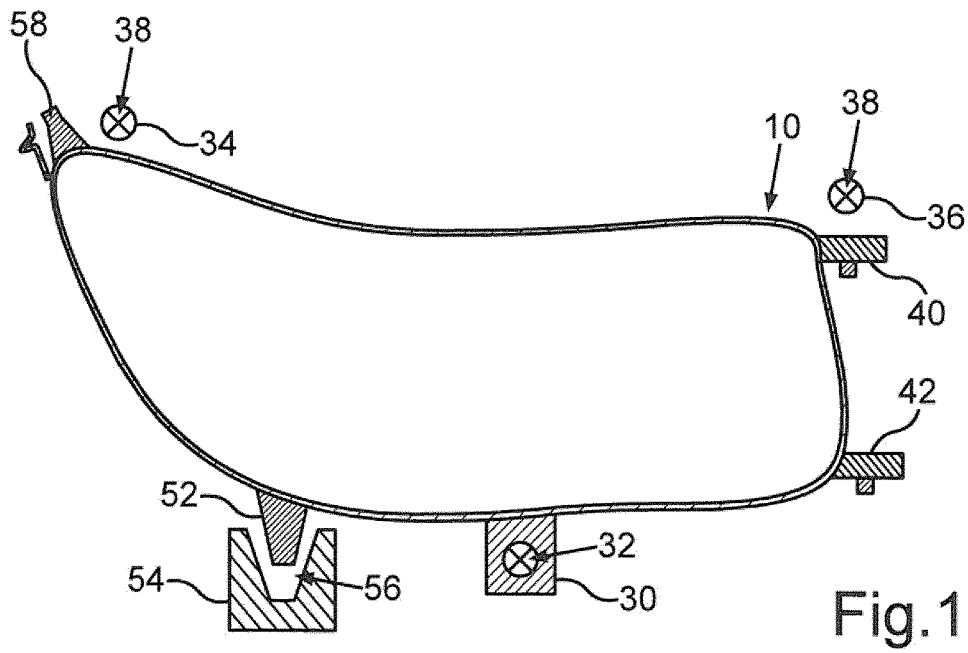
FIG. 1 is a schematic frontal view of a front headlamp for a passenger car according to a first embodiment, which front headlamp is held in a final assembly position on the front-end module by way of a holding device, by which the front headlamp is to be movably held in at least one preassembly position at the front-end module relative to the front-end module.
Figure 2:
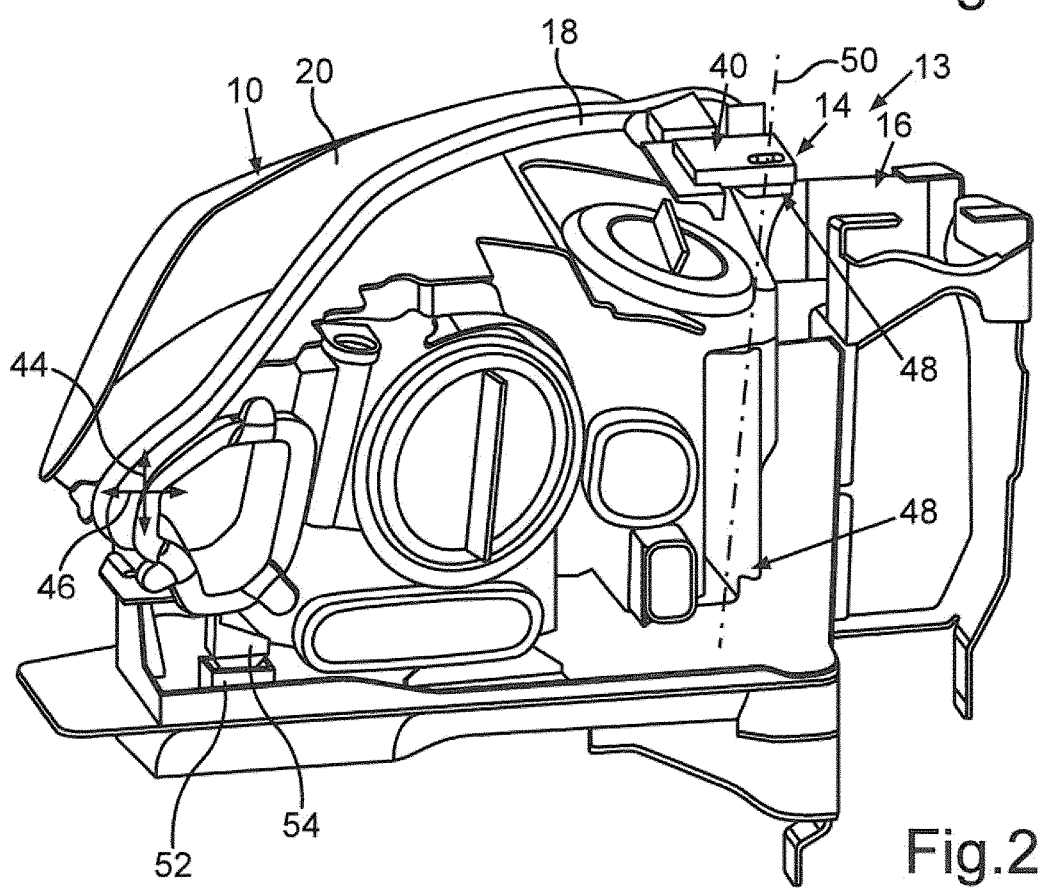
FIG. 2 is a schematic and perspective rear cut out view of the front headlamp according to a second embodiment, which front headlamp is movably held relative to the front-end module in its preassembly position by way of the holding device on a corresponding holding element of the front-end module.
Figure 3:
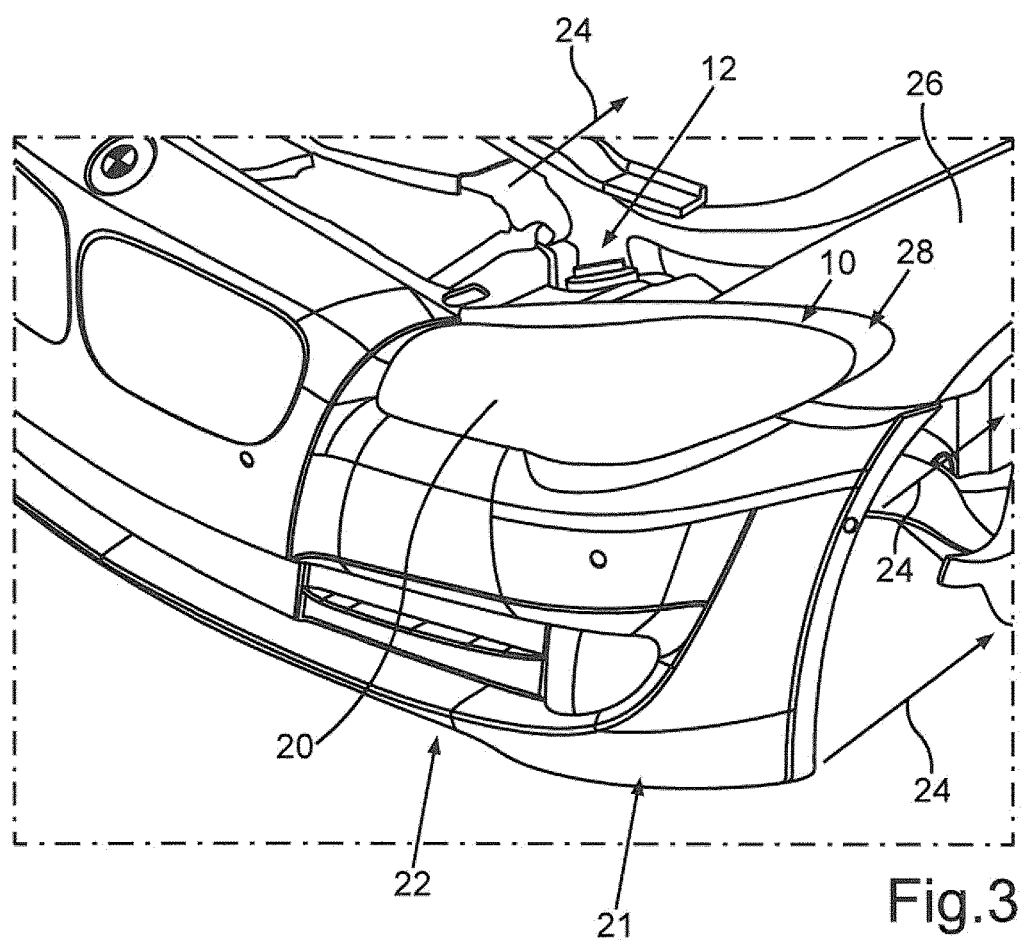
FIG. 3 is a schematic and perspective frontal cut out view of a module component including the front-end module and the front headlamp during the mounting of the module component on the body of the passenger car, during which, because of the movability of the headlamp held on the front-end module, an adjusting of the front headlamp can take place, within whose scope the front headlamp is moved relative to the front-end module and/or relative to the vehicle body.

FIG. 1 illustrates a front headlamp, marked as a whole by reference number 10, according to a first embodiment for a passenger car. Within the scope of a holding arrangement visible in FIG. 3-FIGS. 2 and 3 showing the front headlamp 10 according to a second embodiment—, the front headlamp 10 is held by way of a holding device visible in FIG. 2 and as a whole marked by reference number 13 on a front-end module (FIG. 3) marked by reference number 12. In other words, the front-end module 12 is equipped with the front headlamp 10. For this purpose, a holding element 16 of the front-end module 12 is provided and corresponds with the front headlamp 10. The holding element 16 is visible in FIG. 2 and holds the front headlamp 10. The front headlamp 10 includes a shell 18 and a disk 20 connected with the shell 18, which disk 20 is usually also called a lens. The holding element 16 is a component of the holding device 13. In other words, the holding device 13 includes the holding element 16. In addition, the holding device 13 includes a fixture device 14.

The front-end module 12 includes, for example, at least one support not visible in FIG. 3, to which the holding element 16 is fastened. A bumper covering 21 which is visible in FIG. 3 is also fastened to the support and/or to a different support of the front-end module, by which bumper covering 21, a bending cross-member of a bumper of the passenger car is covered. The cross-member extends at least essentially in the transverse direction of the vehicle. The bumper including the bending cross-member and the bumper covering 21 is a part of a module component which, as a whole, has the reference number 22. The module component 22 therefore comprises the bumper with the bumper covering 21, the front headlamp 10 as well as the front-end module 12 and additional attachment parts. The module component 22 may, for example, be preassembled simultaneously with the manufacturing of the passenger car and, in particular, simultaneously with the manufacturing of the body of the passenger car and can subsequently be joined with the vehicle body as a preassembled module component.

A joining direction into which the module component 22 and therefore the front-end module 12 are moved relative to the vehicle body, in order to join the module component 22 with the vehicle body, is indicated in FIG. 3 by direction arrows 24. This joining direction coincides with the longitudinal direction (x-direction) of the vehicle and, in the present case, extends from the front to the rear. The joining direction can also coincide with the transverse direction (y-direction) of the vehicle or extend in different directions.

A side wall in the form of a front fender 26 is also fixed to the vehicle body. The fender 26 is a covering element for covering the vehicle body shell. As illustrated in FIG. 3, a receiving area 28 is bounded by the fender 26, into which receiving area 28 the front headlamp 10 is moved, at least in sections, when the front-end module 12, together with the front headlamp 10 held on it, is moved in the joining direction relative to the vehicle body. As an alternative, the receiving area 28 could be bounded by an attachment part held on the fender 26, in which case, after the mounting of the front headlamp 10, the attachment part could, for example, be removed again from the fender 26.

A first fixing element 30 visible in FIG. 1 is provided for fixing the front headlamp 10 on the front-end module 12. The fixing element 30 is, for example, a lug having a passage opening 32, whereby a screwing point is provided. By way of the fixing element 30, the front headlamp 10 can be screwed to the front-end module 12 in the x-direction. In the case of front headlamps of large dimensions and/or a heavy weight, several fixing elements may be provided. This takes place, for example, after the mounting of the front-end module 12 on the vehicle body. The fixing element 30 may have a tolerance compensation element, in order to, for example, be able to compensate production-caused tolerances and offsets.

FIG. 1 also illustrates in a particularly schematic manner fixing elements which also have the purpose of fixing the front headlamp 10 at the front-end module 12, preferably when the passenger car is already standing on its own wheels. The fixing elements 34, 36 each have a screw opening 38. As a result, a respective screwing point is provided by the fixing elements 34, 36, so that the front headlamp 10 can be screwed to the front-end module 12. The fixing element 34 permits, for example, the screwed connection in the vertical direction (z-direction) of the vehicle, in which case the fixing element 34 may or may not have a tolerance compensation element. In contrast, the fixing element 36 provides the screwed connection of the front-end module 12 with the vehicle body in the vertical direction (z-direction) of the vehicle, in which case the fixing element may or may not have a tolerance compensation element.

The fixture device 14 includes holding elements 40, 42, which are provided at the front headlamp 10 and by which the front headlamp 10 is to be held on the holding element 16 and, by way of latter, at the front-end module 12. The fixture device 14 includes, for example, also holding elements for the holding of the front headlamp 10 at the front-end module 12, which correspond with the holding elements 40, 42 and are provided at the front-end module 12, particularly at the holding element 16.

In this case, the front headlamp 10 is held in a final assembly position of the front headlamp 10 at the front-end module 12 by way of the holding device (fixture device 14 and holding element 16). In other words, the holding device 13 permits the holding of the front headlamp 10 at the front-end module 12 in a final assembly position of the front headlamp 10. By means of the holding device 13, the front headlamp 10 is to be movably held relative to the front-end module 12 also in at least one preassembly position at the front-end module 12. This preassembly position is illustrated in FIGS. 2 and 3. In other words, the front headlamp 10 is held in its preassembly position at the front-end module by way of the holding device 13, in which case the front headlamp 10 can be moved relative to the front-end module 12 in this condition held at the front-end module 12. This means that the holding device 13 permits a motion of the front headlamp 10 relative to the front-end module 12 and therefore relative to the vehicle body, although the front headlamp 10 is already held at the front-end module and is therefore preassembled on it.

As a result of this mobility of the front headlamp 10 in its condition held at the front-end module 12, tolerances and offsets of the front headlamp 10 relative to the vehicle body and particularly to the fender 26 held at the vehicle body can be compensated. The holding element 40 permits, for example, an alignment of the front headlamp 10, i.e. a motion of the latter relative to the front-end module 12 and relative to the vehicle body or to the fender 26 in the longitudinal direction of the vehicle and in the vertical direction of the vehicle. The holding element 42 permits an alignment of the front headlamp 10 in the longitudinal direction of the vehicle. This means that the front headlamp 10 can be moved in its preassembly position relative to the front-end module 12 in the transverse direction of the vehicle and in the vertical direction of the vehicle, which is illustrated in FIG. 2 by direction arrows 44, 46.

Furthermore, the fixture device 14 has swivel joints 48, which permit a swiveling of the front headlamp 10 relative to the front-end module 12 about a swiveling axis 50 in the preassembly position of the front headlamp 10. This means that the front headlamp 10 can be moved not only relative to the front-end module and relative to the fender 26 but can also be swiveled.

The fixture device 14 further has a first positioning element 52 provided at the front headlamp 10 as well as at least a second positioning element 54 corresponding therewith and provided at the front-end module 12. The second positioning device 54 has a receiving fixture 56 for the first positioning element 52. The receiving fixture 56 is bounded by mutually diagonally extending surfaces of the second positioning element 54. The mutually diagonally extending surfaces of the second positioning element 54 are able to interact with mutually diagonally extending surfaces of the first positioning element 52. The respective mutually diagonally extending surfaces act as insertion chamfers, so that the front headlamp 10 is positioned in the longitudinal direction of the vehicle, the transverse direction of the vehicle and the vertical direction of the vehicle when the first positioning element 52 is moved into the receiving fixture 56. By means of this prepositioning, the front headlamp 10 in its prepositioned state at the front-end module 12 can be securely moved together with the front-end module 12 and can thereby be transported.

During the joining of the front-end module 12 with the vehicle body, the positioning elements 52, 54 preferably permit a motion of the front headlamp 10 relative to the front-end module 12 and relative to the fender 26 within predefinable limits. When the front-end module 12 and, together with the latter, the front headlamp 10 are moved into the joining direction in order to join the front-end module 12 with the vehicle body, the front headlamp 10 is at least partially moved into the receiving fixture 28. In this case, the swivel joints and the holding elements 40, 42 permit a motion, i.e. a swiveling as well as a moving of the front headlamp 10 when the front headlamp 10, for example, slightly contacts the fender 26 bounding the receiving area 28. As a result, a force- and/or form-locking alignment of the front headlamp 10 relative to the vehicle body can be implemented, which is accompanied by the motion of the front-end module 12 and the front headlamp 10 relative to the vehicle body.

As an alternative or in addition, at least one aligning element 58 (FIG. 1) is provided at the front headlamp 10, which aligning element 58, when the front-end module 12 is arranged on the vehicle body, is caused to interact with a second aligning element provided at the vehicle body or held on the vehicle body. By means of these aligning elements, the front headlamp 10, during its motion, is aligned relative to the vehicle body and particularly is positioned relative to the fender 26. This positioning or aligning takes place, for example, in a force- and/or form-locking manner by way of the interacting aligning elements. A pin or a bolt, a ball or another aligning element may be used as such an aligning element.

By the interaction of the aligning elements and/or the interaction of the front headlamp 10 with the fender 26, a clearance of a joint is set, for example, between the front headlamp 10 and the fender 26 without the requirement of time-consuming and costly refinishing. As an alternative or in addition, a clearance of a joint between the front headlamp 10 and the bumper covering 21 and/or a clearance of a joint between the front headlamp 10 and a front-opening hood in the form of an engine hood, which is not shown in the figures, can thereby be adjusted in its closed position.

By means of the alignment, the front headlamp 10 is moved into its final assembly position, in which it is finally fixed at the front-end module 11 and/or at the vehicle body. This fixing can, for example, take place by screwed connections. In this case, the fixing of the front headlamp 10 in its final assembly position can take place independently of a process structure. As a result, the entering of tensions into the front headlamp 10 can be minimized. Furthermore, a particularly advantageous joint image with a uniform clearance can thereby be implemented.

The mounting of the front headlamp 10, for example, takes place such that, by way of the fixture device 14, particularly the holding elements 40, 42, the front headlamp 10 is first hung in at the front-end module 12. The holding element 40 and/or 42 is, for example, fitted into an oblong hole, which extends in the transverse direction (y-direction) of the vehicle. In this state, the front headlamp 10 is held accurately to size in the vertical direction (z-direction) of the vehicle and in the longitudinal direction (x-direction) of the vehicle at the front-end module but can still be moved. In this case, the front headlamp 10 can still be moved in the y-direction, tilted about the x-direction and swiveled about the z-direction. Furthermore, the front headlamp 10 could be lifted off the front-end module 12 upward in the z-direction. First, only three of six degrees of freedom are therefore restricted. For restricting a fourth degree of freedom, the front headlamp 10 is fixed, for example, by means of a holder, in such a manner that it is fixed in the z-direction so it can also no longer be lifted off in the upward direction. Finally, a further fixing takes place in the x-direction, so that the front headlamp 10 can no longer be swiveled about the z-direction. In this state, the front headlamp 10 could still only be moved in the y-direction. In order to fix the front headlamp in its mounted position, the sixth and last degree of freedom will also be restricted, so that the front headlamp 10 can also no longer be moved in the y-direction. As a result, a simple alignment of the front headlamp 10 relative to the front-end module 12 and to the vehicle body can take place first, whereupon the front headlamp 10 is securely fixed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of mounting a front-end module and at least one front headlamp on a vehicle body of a passenger car, the method comprising the steps of:
   (a) holding the front headlamp in at least one preassembly position at the front-end module by way of a holding device, by which the front headlamp is held at the front-end module while being movable relative to the latter, wherein the holding device has at least one joint by which the front headlamp is swivelable in the preassembly position relative to the front-end module,
   (b) arranging the front-end module on the vehicle body, together with the front headlamp movably held relative to the front-end module by way of the holding device, the front-end module and, together with the latter, the front headlamp being moved relative to the vehicle body, and
   (c) fixing the front headlamp in a final assembly position, wherein, in step b), at least a first aligning element provided at the front headlamp is caused to interact with a second aligning element assigned to the body of the passenger car, the front headlamp being moved by way of the interacting aligning elements during the motion of the front headlamp relative to the vehicle body into a position relative to the vehicle body and relative to the front-end module.

2. The method according to claim 1, wherein the position relative to the vehicle body and relative to front-end module is a final assembly position.

3. The method according to claim 2, wherein
the holding device holds the front headlamp in the final assembly position.

4. A holding arrangement of a front headlamp on a front-end module of a passenger car, comprising:
a holding device configured to hold the front headlamp in a final assembly position at the front-end module, wherein the holding device is configured to hold the front headlamp in at least one preassembly position at the front-end module in a manner movable relative to the front-end module,
a first aligning element provided at the front headlamp; a second aligning element assigned to a body of the passenger car, wherein the front headlamp is alignable relative to the front-end module and the body of the passenger car by way of the first aligning element interacting with the second aligning element, and
wherein the holding device has at least one joint by which the front headlamp is swivelable in the preassembly position relative to the front-end module.

5. The holding arrangement according to claim 4, wherein the holding device comprises at least one holding element by which the front headlamp is held in the preassembly position at the front-end module while being movable relative to the front-end module.

6. The holding arrangement according to claim 4, wherein the holding device comprises:
at least a first position element provided at the front headlamp;
at least a second positioning element corresponding with the first positioning element and being provided at the front-end module,
wherein motion of the front headlamp in the preassembly position is restricted relative to the front-end module by way of the first and second positioning elements.

* * * * *